United States Patent
Sri-Jayantha et al.

[11] Patent Number: 6,097,565
[45] Date of Patent: Aug. 1, 2000

[54] REPEATABLE RUNOUT FREE SERVO ARCHITECTURE IN DIRECT ACCESS STORAGE DEVICE

[75] Inventors: Muthuthamby Sri-Jayantha, Ossining; Arun Sharma, New Rochelle; Hien Dang, Nanuet, all of N.Y.; Hirouki Suzuki, Fujisawa, Japan

[73] Assignee: International Business Machines Corporation, Armonk, N.Y.

[21] Appl. No.: 08/594,572

[22] Filed: Jan. 31, 1996

[51] Int. Cl.$^7$ .................................................. G11B 5/596
[52] U.S. Cl. ..................................... 360/78.09; 360/77.04
[58] Field of Search ............................. 360/77.02, 77.04, 360/77.06, 77.08; 369/44.32, 44.34

[56] References Cited

U.S. PATENT DOCUMENTS

| | | |
|---|---|---|
| 4,594,622 | 6/1986 | Wallis .............................. 360/77.04 X |
| 5,010,535 | 4/1991 | Davis ............................... 360/77.02 X |
| 5,404,253 | 4/1995 | Painter .................................. 360/77.04 |
| 5,539,714 | 7/1996 | Andrews, Jr. et al. ......... 360/77.04 X |
| 5,550,685 | 8/1996 | Drouin ............................ 360/77.04 X |
| 5,592,346 | 1/1997 | Sullivan .............................. 360/77.04 |
| 5,608,586 | 3/1997 | Sri-Jayantha et al. ............... 360/77.04 |
| 5,617,388 | 4/1997 | Ishioka et al. ................... 360/77.04 X |

FOREIGN PATENT DOCUMENTS 0 130 248 A1  9/1985  European Pat. Off. ............ 360/77.04

*Primary Examiner*—Paul Loomis
*Assistant Examiner*—K. Wong
*Attorney, Agent, or Firm*—Heslin & Rothenberg, P.C.

[57] ABSTRACT

In a direct access storage device including a rotating disk, a head positioned for interaction with said disk, an actuator for carrying said head and a servo system for operating said actuator so as to follow a substantially circular track on said disk by responding to a position error signal, a method for reducing response of the servo system to radial runout of the circular tracks, comprising the steps of obtaining radial runout data; filtering the data; storing the filtered data; subtracting the filtered data from the position error signal to obtain a corrected position error signal; and using the corrected position error signal to control the servo system. A direct access storage device in accordance with the invention includes means for obtaining radial runout data; means for filtering the data; means for storing the filtered data; means for subtracting the filtered data from the position error signal to obtain a corrected position error signal; and means for controlling the servo system using the corrected position error signal.

20 Claims, 10 Drawing Sheets

REPEATABLE RUNOUT FREE SERVO ARCHITECTURE IN DIRECT ACCESS STORAGE DEVICE

FIELD OF THE INVENTION

This invention relates to direct access storage devices. More particularly this invention relates to a servo system architecture and a method of operating the servo system in devices such as a disk drive.

BACKGROUND ART

High precision and low power electromechanical system design is required for future direct access storage devices (DASDs), particularly targeted for mobile computer systems. Without limiting operating vibration performance, servo architecture of a DASD should be capable of providing low positioning error without exceeding a competitive power budget.

Conventional methods attempt to achieve minimum positioning error by reducing the repeatable runout (RRO) component, that is any deviation from an ideal circular track, due to for example mechanical tolerances or servo writing, at the manufacturing level by imposing very severe manufacturing tolerance requirements, or by implementing gain enhancing algorithms, such as feedforward or narrow band filters, at RRO spectral frequencies. These approaches either require high cost manufacturing methods or increased track following voice coil motor (VCM) power. In track following mode a disk actuator servo is designed to minimize head positioning error in the presence of repeatable and non-repeatable runout components (NRRO) that are present in the position error signal (PES). Traditional methods attempt to minimize either the RRO component at source by refining the manufacturing process or suppress RRO by implementing high gain servo schemes. Minimizing RRO at the source has a manufacturing cost penalty while a servo solution that effectively generates frequency specific current to the voice coil motor (VCM) has a power penalty.

A typical DASD servo as shown in FIG. 1, has a PES generating block 10, servo computation block 12, and a digital-to-analog converter (DAC) block 14. FIG. 1 also shows a feedforward scheme including a misposition correction signal generator 16 augmenting the conventional servo to improve RRO track following capability. The output of generator 16 is added to the output of block 12 at a summing node 18. The added output of node 18 is then provided to DAC block 14. The analog output of DAC block 14 is provided to a current driver 20 which provides current to the VCM (not shown in FIG. 1) of the actuator block 22, which represents the mechanical components that control the position of a transducer (not shown) which interacts with a data storage medium (also not shown in FIG. 1).

In the conventional servo architecture the control signal is first computed from PES signal derived from the data surface, and then the control signal generated by the servo computation block 12 is modified by the misposition correction signal (also called a feedforward signal) from block 16. The PES generating block derived from the data surface invariably contains both RRO and NRRO components, represented by block 24. It will be understood that the signal sent to block 10 is the relative difference between a head position signal received from the block 22 and the runout components of a track as represented by block 24. While a subtraction node 25 is shown, it will be understood that this is a theoretical node because it is only the difference, which is generated by block 10 that is available when the recording head signal is processed for use by the servo loop.

SUMMARY OF THE INVENTION

The presence of RRO not only impedes precision of track-to-track spacing but also increases idle mode power. A "No-RRO Servo Architecture" is defined where the servo algorithm avoids tracking the RRO component rather than suppressing the RRO component. The RRO component of the PES is removed by subtracting the "locked arm" RRO prior to generating the servo controller output. The No-RRO Servo Architecture produces high precision track spacing while maintaining conventional crossover frequency. The lock-arm RRO matrix for each sector (referred to as RRO*) can be either measured-and-stored at the manufacturing facility soon after the servo-sectors are written or it can be post computed from product PES and stored using an algorithm.

Basic to the invention is the ability to estimate the unknown RRO* components in the presence of the servo-loop using an inverse filtering concept. The invention simultaneously minimizes VCM power and PES magnitude, thus providing a new path for high track density DASDs at low cost and power. Depending on the implementation resources available on board such as RAM space or computational power, the architecture can be invoked to either save only idle power, or improve both precision and power. The invention may be implemented, for example, in a 3.5" DASD to enhance precision in track following mode. The RRO* is measured and stored in RAM in this configuration. Approximately a 35% reduction in position error signal RMS value is achieved without sacrificing vibration rejection performance.

When RAM space is not available, the RRO* is estimated in real-time in order to implement the No-RRO Servo Architecture. This configuration requires extra spindle revolutions, and is effective only to save idle power and not for high precision tracking. The energy normally spent in tracking RRO components is conserved by this method in which approximately 45% of the VCM RMS power saving is achieved.

DETAILED DESCRIPTION OF THE PREFERRED EMBODIMENTS

Since the RRO component is known to be stable over the life of a DASD and has a well defined amplitude and phase characteristics, the new servo architecture in accordance with the invention exploits this fact by actively avoiding the RRO signal entering the servo computation block of the servo system. In this invention a conventional VCM servo is modified to achieve low power idle and high precision track-to-track spacing by eliminating the RRO component in the PES signal while preserving the desirable vibration rejection characteristics. Alternatively, the original track layout is electronically modified and mapped into "virtual tracks" that are free of RRO components.

Figure 2:
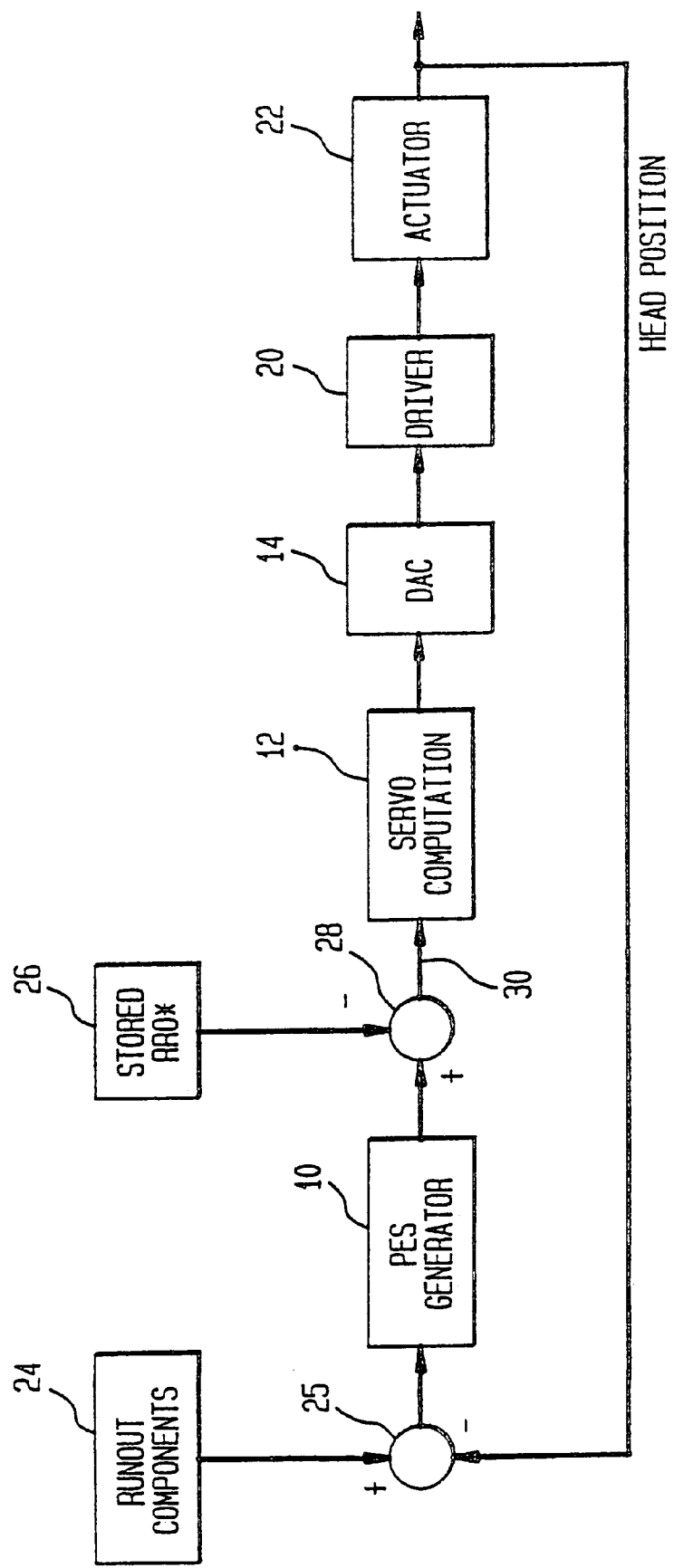
FIG. 2 is a conceptual block diagram of a servo loop in accordance with the invention.

The "No-RRO Servo Architecture" is based on the fact that the RRO that is inevitably included in the PES stream need not be track-followed. This is the key to this innovation and the concept is shown in FIG. 2. The only PES components that are random are the NRRO and vibration induced PES.

Figure 1:
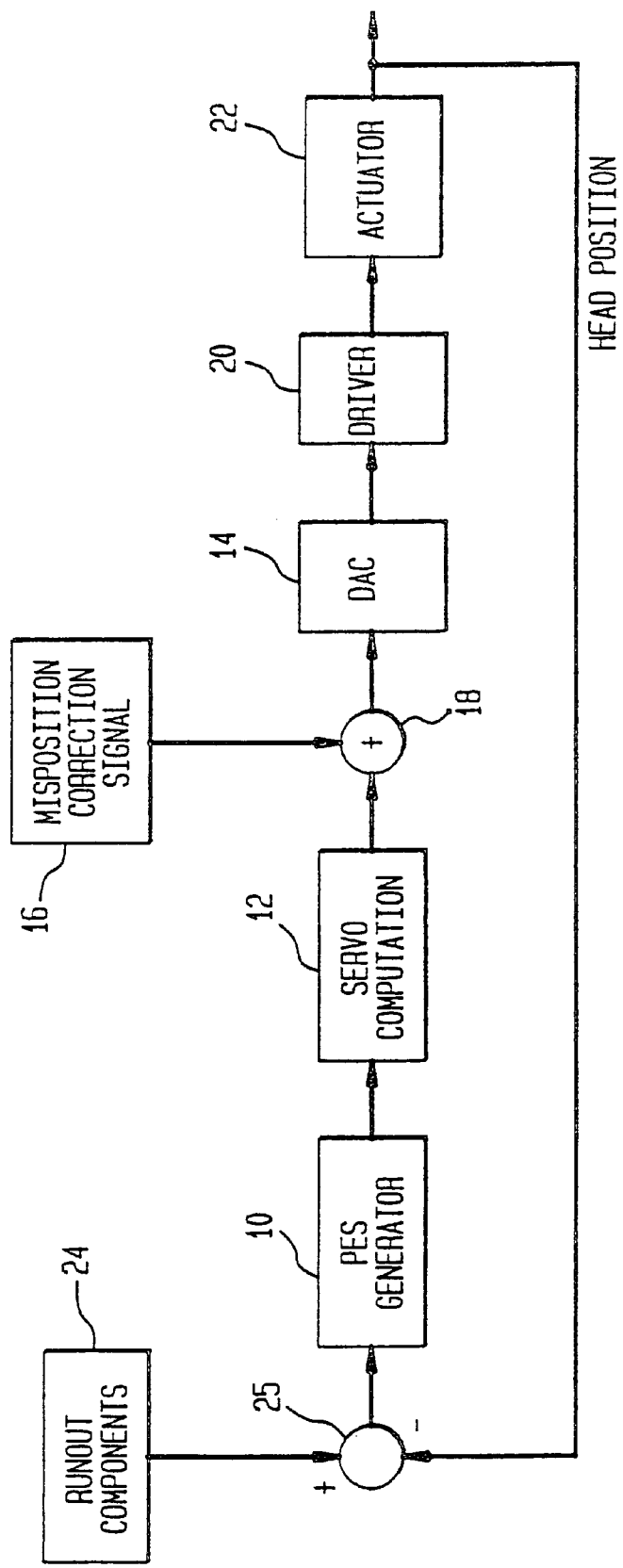
FIG. 1 is a block diagram of a prior art servo loop.

In FIG. 2, wherein like numerals are used to describe like blocks found in FIG. 1, it can be seen that the PES signal from the data surface is corrected by removing the RRO* component, represented by block 26, by being subtracted from the output of block 10 at node 28, by way of line 30, before being presented to the servo computation block 12. The output of servo computation block 12 is then presented to the DAC block 14 with no further correction such as feedforward compensation. The invention can be implemented in various forms where the method of generating and storing RRO* may differ from each other.

In order to achieve the No-RRO Servo Architecture the RRO* corresponding to each sector on every track in a DASD under servoless condition must be known in advance. For example, if a DASD has 5000 tracks with 50 sectors per track, then the RRO* will be a matrix of 5000×50 elements. The RRO* can be either "measured" and stored at the manufacturing site or else "estimated" and stored using product servo and microcode.

The RRO* can be simply measured while the arm is locked to an external reference during manufacturing, and then recorded in the same DASD for future use. This is called measured RRO*.

Figure 3:
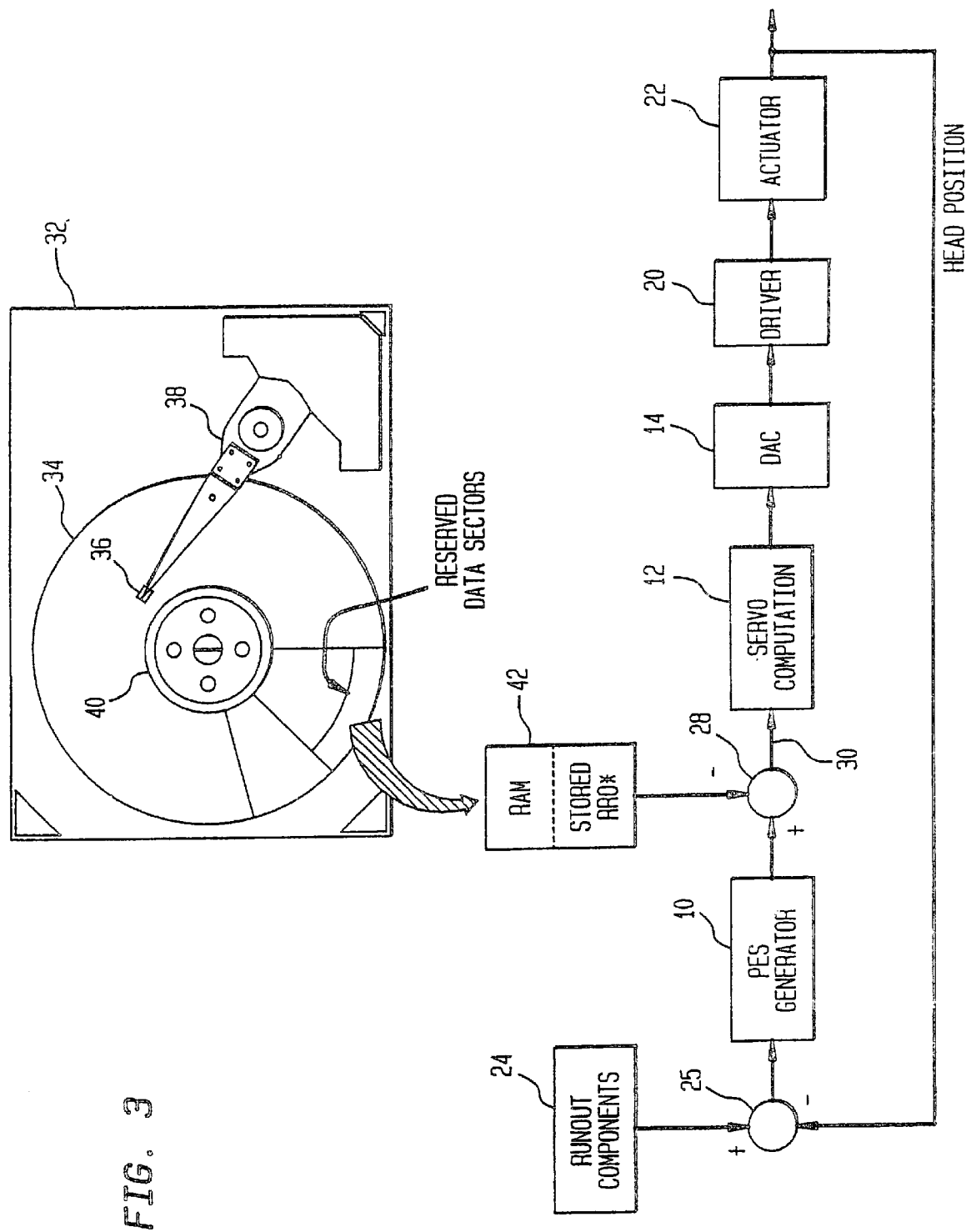
FIG. 3 is a block diagram of a first embodiment of a servo loop in accordance with the invention.

FIG. 3 shows a RAM-based implementation of measured RRO* in which the RRO* (from a DASD 32, having a disc 34, which interacts with a head 36 at the end of an actuator 38, when the disk is rotated by a spindle motor 40 in a manner well known) is stored in a reserved data zone of the disk during manufacturing, and read into a RAM 42 during power up. The RAM-based RRO* is then subtracted from the PES in the track-following mode.

Figures 4A, 4B:
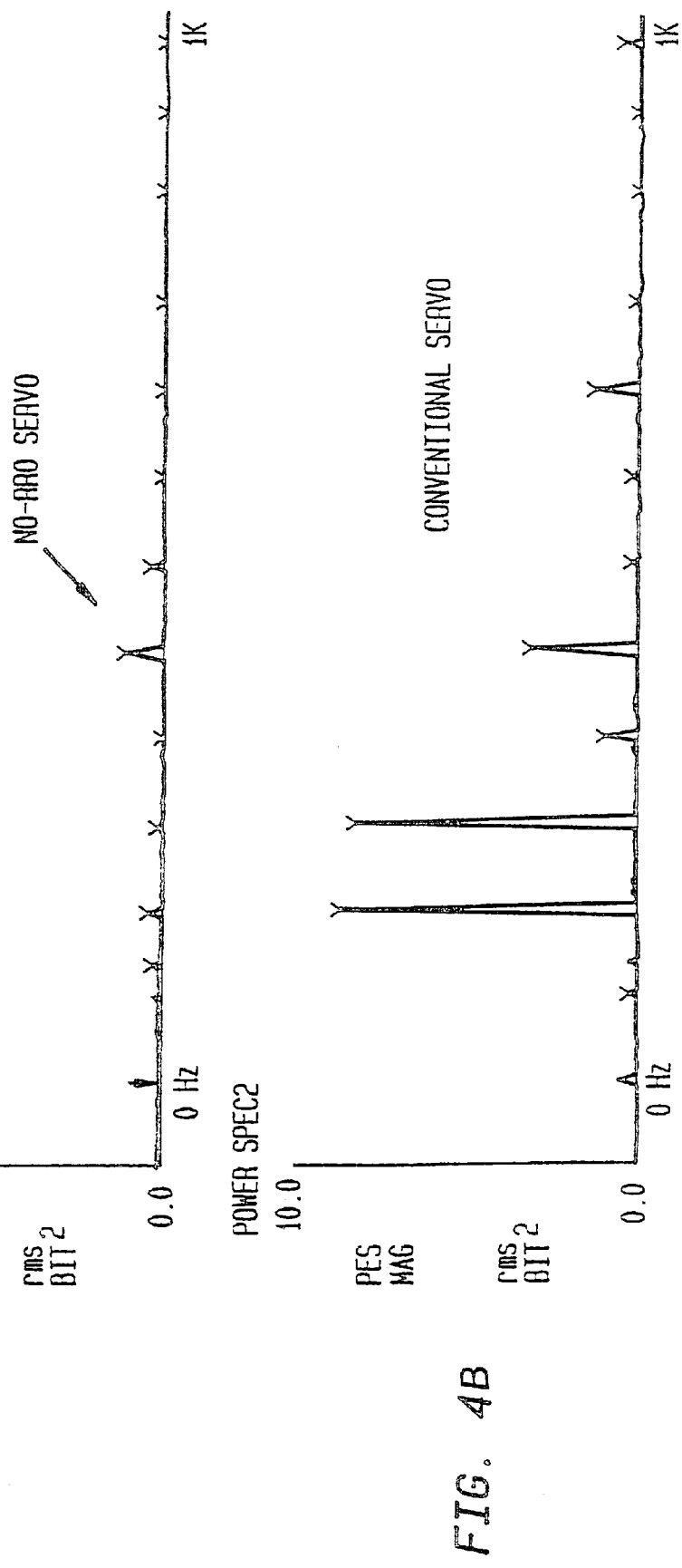
FIG. 4A is a PES spectrum of a servo loop operating in accordance with the invention.
FIG. 4B is a PES spectrum of a servo loop operating in accordance with the prior art.

FIG. 4A and FIG. 4B show experimentally obtained PES spectra with and without the No-RRO Servo Architecture in which the RRO* for each sector is stored in a RAM and subtracted from the PES stream in track-following mode. A reduction in total RMS error of approximately 30% is demonstrated in this case. Almost all RRO spectral peaks have been effectively removed.

Figure 5:
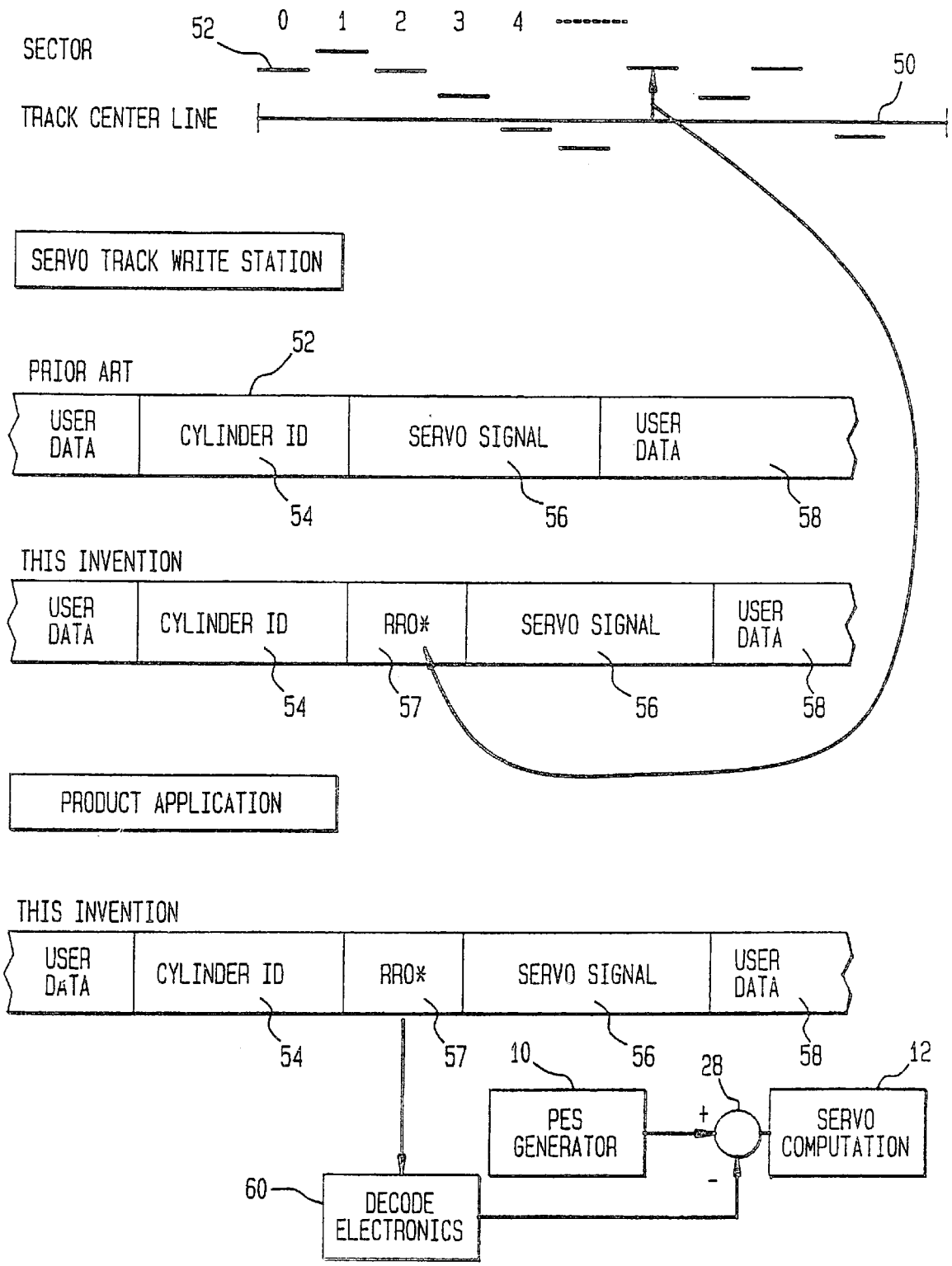
FIG. 5 is a representation of a second embodiment of the invention.
Figure 5A:
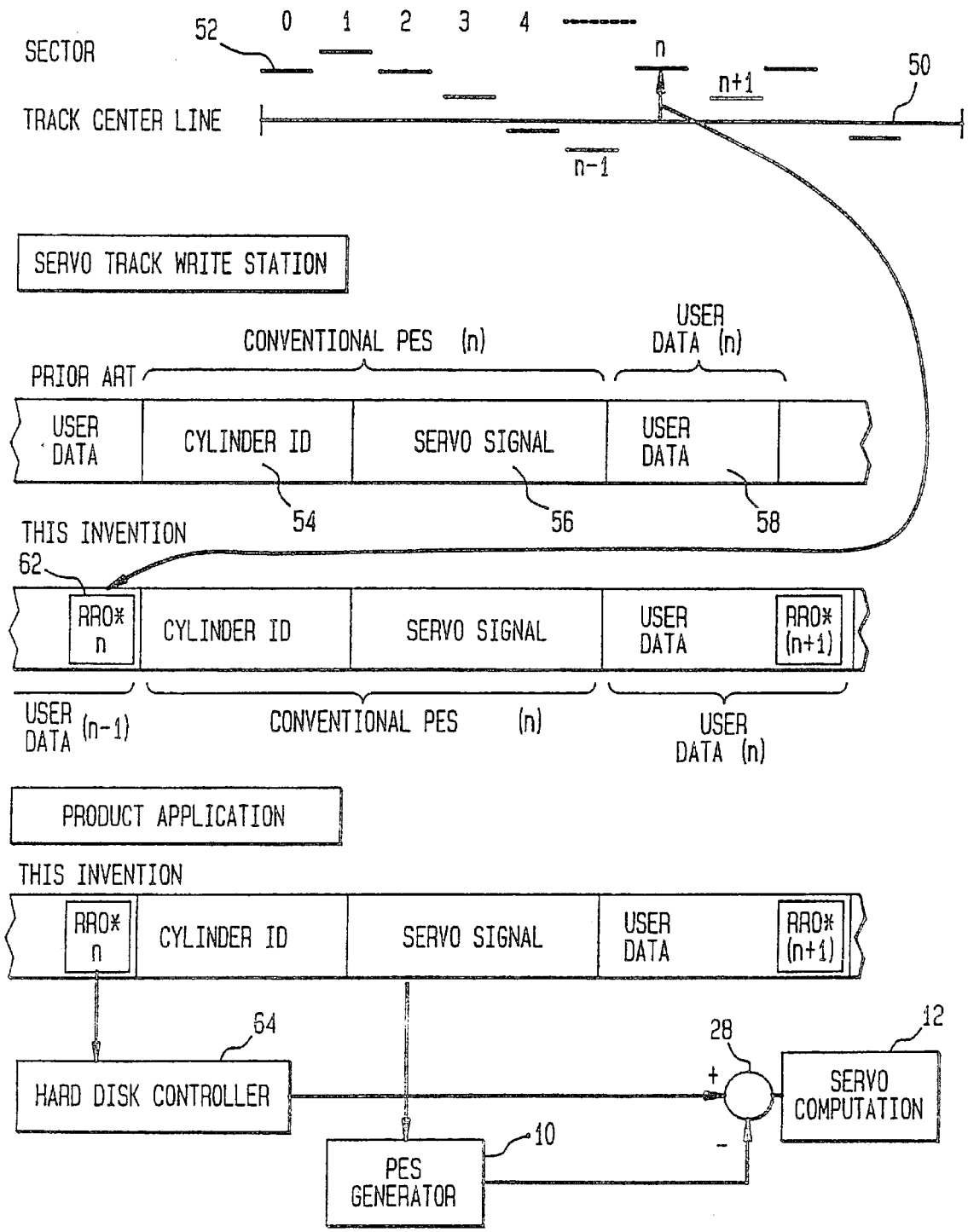
FIG. 5A illustrates a variation of the embodiment of FIG. 5.

The "Locked-Arm RRO" can also be embedded in the servo pattern as shown in FIG. 5. In this case no RAM space is required, but more servo write time is needed. A track center line 50, represented as a straight line in FIG. 5, is divided into a plurality of sectors 52. In the prior art, each sector 52 includes stored data for cylinder identification (ID) 54, servo signal data 56 and finally user data 58. In the practice of the invention, the RRO* data is stored in a block 57 between cylinder ID data 54 and user data 56. In practice, a decode electronics block 60 decodes the data from the disk 34 and provides it node 28 in a manner analogous to block 26 of FIG. 2 or RAM 42 of FIG. 3. The digitally encoded locked-arm RRO data is decoded and subtracted from the PES stream by the microprocessor which controls the servo loop. The realization of No-RRO servo architecture according to FIG. 5 is identical to the performance of the RAM-based method except that the cost of RAM is exchanged for the complexity of servo writing the measured RRO* adjacent to the conventional servo signal band. As illustrated in FIG. 5A, a compromise between excessive RAM space and excessive servo-write time can be made by estimating the RRO* using the inverse filter during the typical 24 hour test process that each DASD undergoes and then by recording the estimated RRO* in the user data zone as a reserved byte. For example if the standard data block size is 512 bytes, then the 513th byte of the previous data sector will contain the estimated RRO*. This is illustrated in FIG. 5A by data block 62. For the nth sector PES, the previous data zone (n−1) will provide the necessary byte corresponding to RRO*. During the read mode of a file this is a continuous process. The hard disk controller must identify the reserved byte from the user bytes and present it to the servo controller operation. This may be accomplished in a hard disc controller chip 64. During the write process care should be exercised to allow for a quick read of the reserved byte. With the invention of magnetoresistive heads, the read and write operations are independent and the task of reading RRO* should not be of any concern. A second approach is to use the product DASD servo system to position the head and then estimate the RRO* matrix. In this case an external reference is not required, but the DASD servo system gain must be accounted for in order to obtain RRO*. The equivalent of a "locked-arm RRO" can be estimated and stored using an "inverse filtering algorithm", which is an alternative means to implement the no-RRO servo architecture. The inverse filtering method is applied to generate the RRO* matrix and stored on the disk in a manner similar to the case shown in FIG. 3. Both methods require RAM space for precision tracking. On the other hand RRO* can be estimated in real time on a track to track basis to conserve idle-mode power without requiring a large RAM space.

Figure 6:
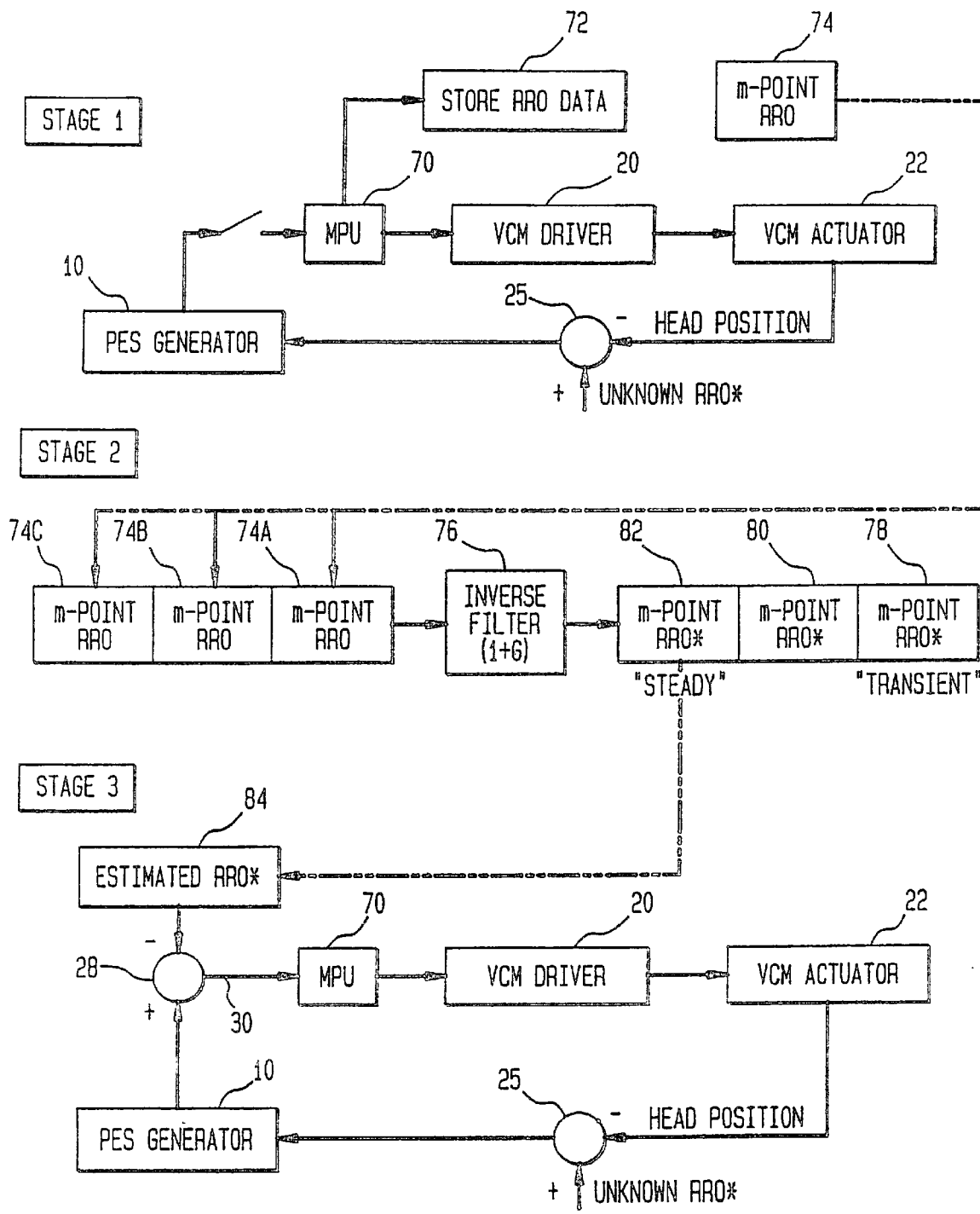
FIG. 6 is a general flow diagram of a method which may be used to implement the invention.

FIG. 6 shows an algorithm for extracting the RRO* in three stages. In the first stage the PES signal corresponding to a given track is averaged on a sector-to-sector basis to estimate the RRO with the servo loop active. A microprocessor (MPU) 70 performs not only this data handling, but also performs the functions of servo computation block 12 (FIG. 2) to control the servo loop. This operation will produce m number of data points corresponding to an m sector DASD where m is typically about 50. This operation can employ N number of revolutions where N is about 20 revolutions. The RRO is the effect of yet unknown locked-arm runout components (earlier defined as RRO*) acting through the $(1/(1+G))$ rejection transfer function of the servo/mechanical system where G is the total open loop transfer function of the system. At the end of this first stage, the averaged RRO data for the m points is available in block 74 for use in the second stage.

In stage two the estimated m-point RRO (with the servo-loop active) is passed through a digital filter 76 with the transfer function $(1+G)$. The $(1+G)$ can be viewed as a digital filter operating on the m-point RRO input to recover the unknown RRO* through the inverse operation, and hence the term inverse filter. The input RRO is concatenated for several revolutions as represented by successive data sets 74A, 74B, etc. (one for each revolution) so that any inverse-filter transients are allowed to decay prior to storing of the output. The transient filter output is represented by block 78, an intermediate output is represented by block 80, and the steady state output is represented by block 82.

The block 82 output of the filter corresponding to m-point RRO input is stored in a memory as m-point RRO* (i.e., locked arm RRO) for use in the third stage. While the third output set of filter 76 is used in FIG. 6, it will be understood by those skilled in the art that it may be desirable to use a later output set, depending on how quickly the output of filter 76 reaches a steady state.

In stage three, the stored values of block 82 are used as the estimated RRO* for operation of the servo loop. The estimated RRO* is subtracted from the PES signal in real time at node 28, so that the control algorithm operates on the difference between the PES and the estimated RRO*. For each track/sector this operation need to be repeated as warranted if RRO* is not generated and stored all at once following the manufacture of the DASD. When RRO* is computed in real time, a large memory space is not required, but the no-RRO servo architecture mode can not be invoked instantly.

Figures 7A, 7B:
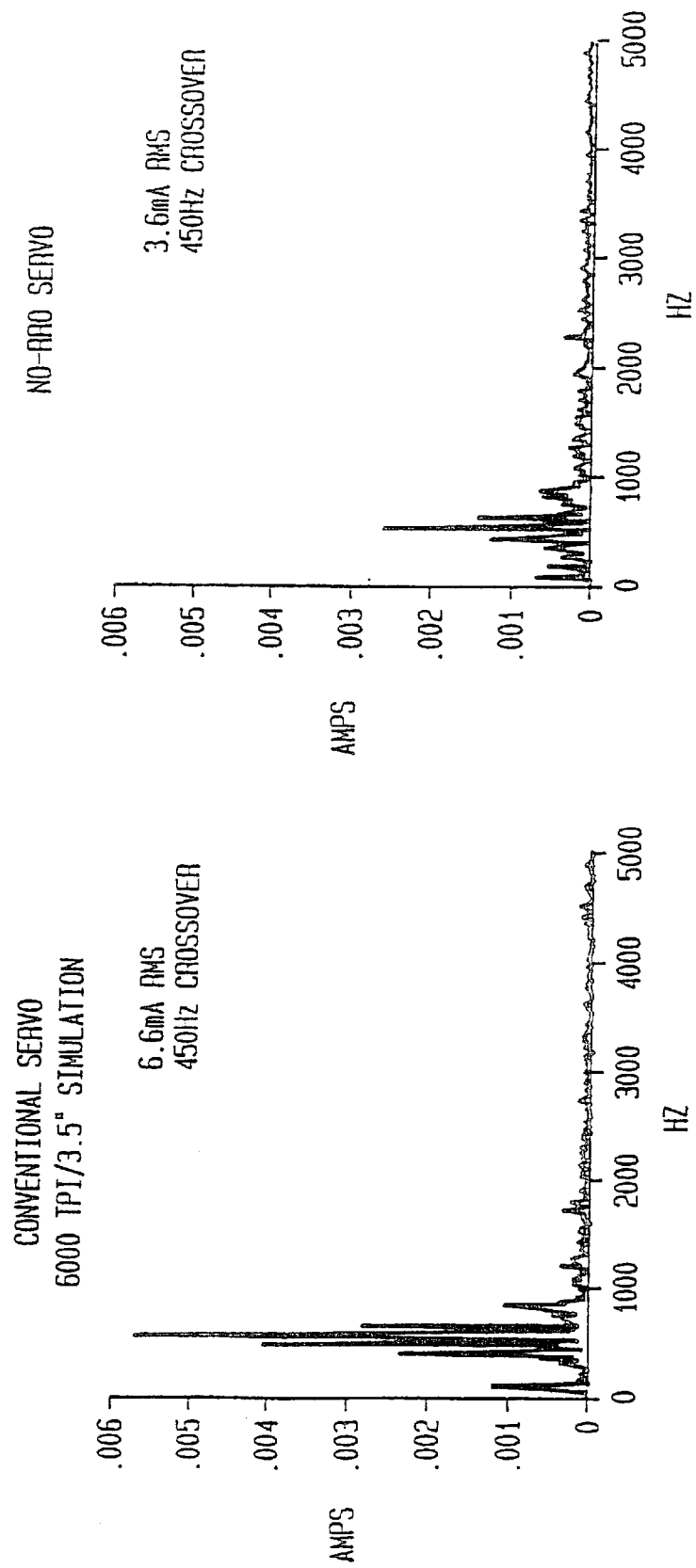
FIG. 7 is a VCM current spectrum with and without no-RRO architecture.
Figure 8A:
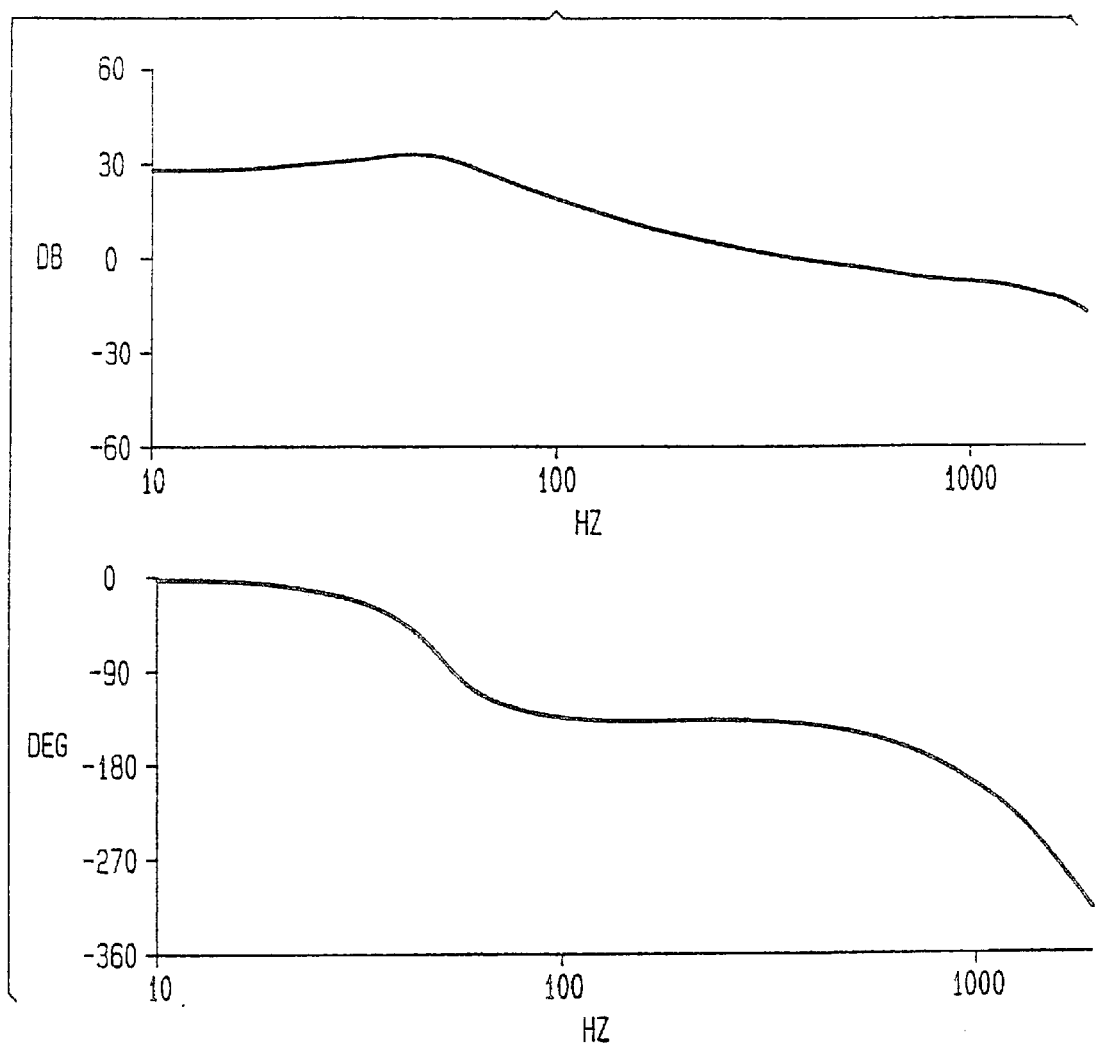
FIG. 8A is a typical open loop transfer function used to estimate RRO* using an inverse filter.
Figure 8B:
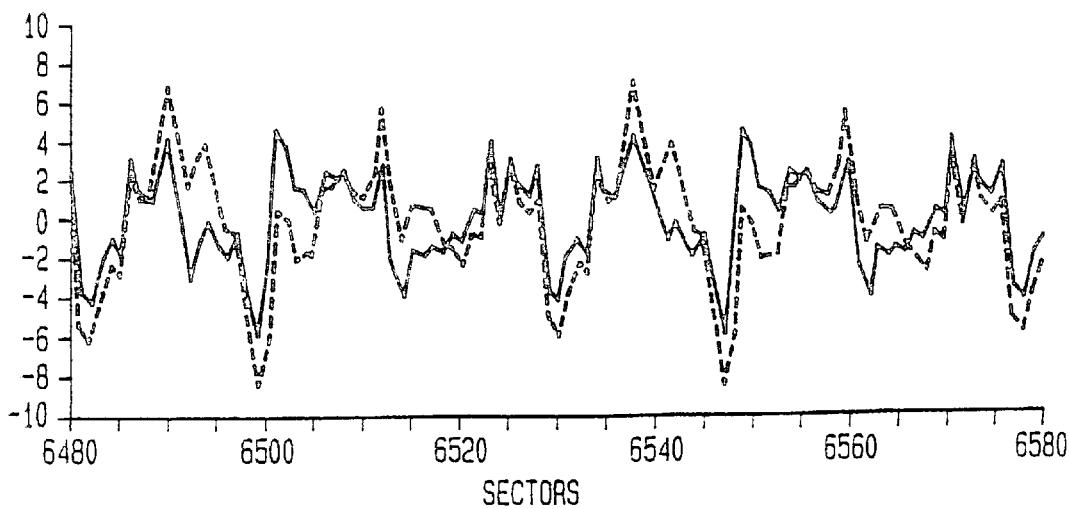
FIG. 8B illustrates mismatch between the original RRO* and estimated RRO*.
Figure 9A:
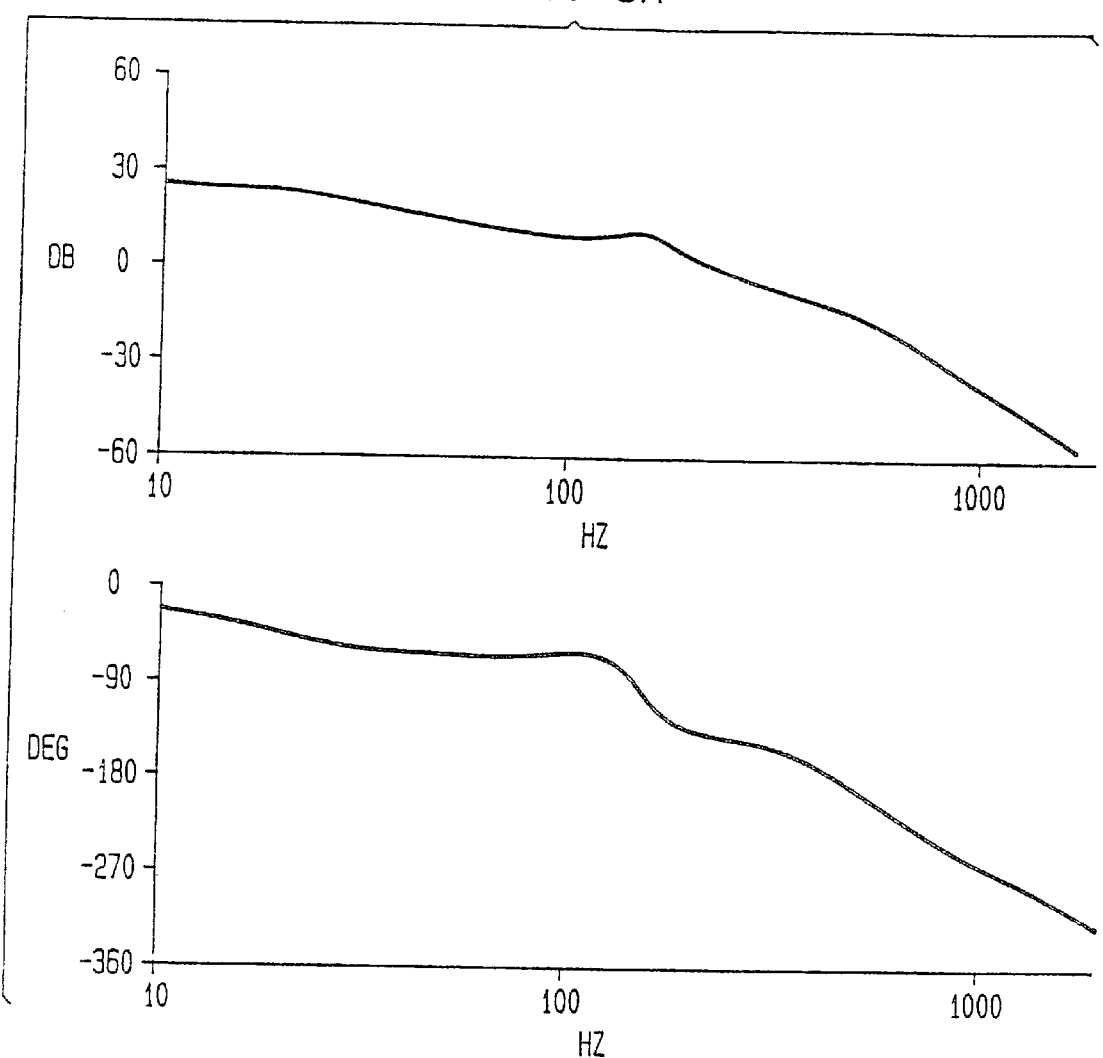
FIG. 9A is a modified open loop transfer function used to improve the estimate of RRO* using an inverse filter.
Figure 9B:
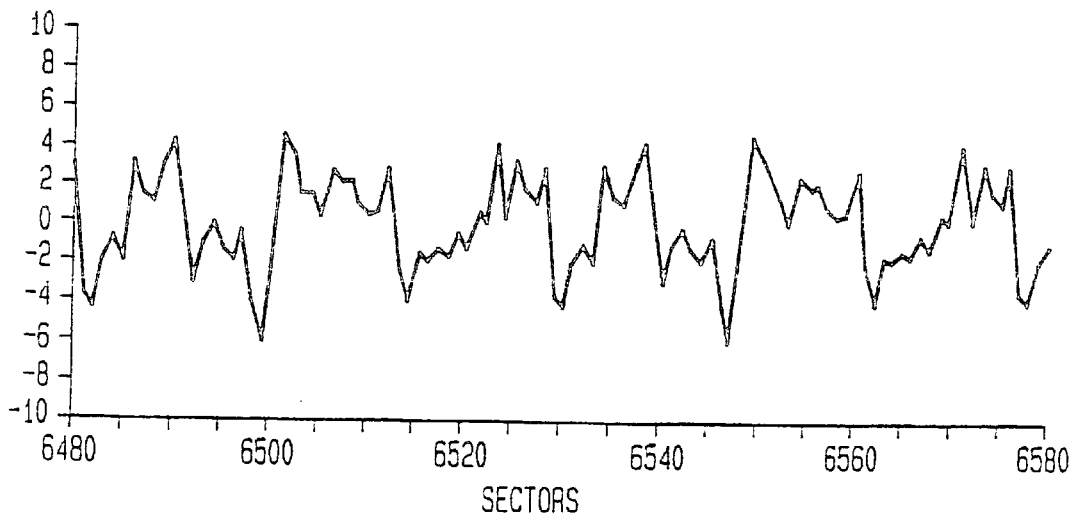
FIG. 9B illustrates the original RRO* and Estimated RRO* being in good agreement.

The concept is implemented and evaluated on a 6000 TPI 3.5" DASD simulation model. The inverse filter is implemented with a proportional and derivative servo controller only (with no integral term) so that low frequency estimation errors are not adversely enhanced by the numerical operations required to produce RRO*. FIG. 7A and FIG. 7B show the conventional track following mode and RRO-free idle mode spectrum of actuator current. The nominal 6.6 mA RMS is reduced to 3.6 mA by this operation (45% reduction). Frequency spectrum shows reduction in current amplitude at frequencies around 500 Hz. The amount of power saving that is made possible by this scheme depends on the magnitude of RRO present. Larger RRO components will result in greater power savings. To identify limitations of the inverse filter-based RRO* estimation process two numerical experiments are conducted with a comprehensive dynamic simulation model. FIG. 8 and FIG. 8B show a conventional track-following transfer function used to estimate the RRO* from the originally servo-written in RRO*. As can be seen in FIG. 8B, the match is not exact, and it demonstrates the non-obvious nature of the inverse filter concept. The random processes associated with a disk file causes the servo-on PES to drift due to hysteresis and electronic noise in the feedback system. The conventional control (FIG. 8A) exaggerates the drift. As can be seen in FIG. 8B, the match between estimated RRO* and actual RRO* is not good, particularly at low frequencies. This is attributed to a complex interaction of actuator hysteresis and controller transfer function characteristics. However, when the open loop transfer function is modified to have crossover and roll-off characteristics as shown in FIG. 9A, the reconstruction of RRO* was accurate. The controller of FIG. 9A still has sufficient vibration rejection characteristics, but due to its transfer function characteristics, advantageously does not amplyfying the higher harmonics. For example, the gain at the fundamental frequency of 70 Hz. (the frequency of rotation of the disk) is 0 db in the controller of FIG. 9A, which is considerably lower than the 20 db or so of the controller of FIG. 8A.

The modified versions of RRO minimization concept can be achieved in many other ways. For instance, if a single frequency RRO is found to be dominating the PES then a band pass filter is used to compute the RRO and then the corresponding RRO* is generated knowing the gain of (1+G) at that frequency. Therefore, variations of this concept of removing RRO either totally or partially can be traded-off with simplicity of computational algorithm.

When a major disk shift is encountered after the manufacture of a DASD, it is critical to eliminate the PES error due to disk-shift while in high precision mode by means of a gain enhancing filter. On the other hand, in the idle mode the VCM power is reduced by turning off the high gain filter, or further reduced by notching the fundamental harmonic component of the PES in the PES generation block.

What is claimed is:

1. In a direct access storage device including a rotating disk, a head positioned for interaction with said disk, an actuator for carrying said head and a servo system for operating said actuator so as to follow a substantially circular track on said disk by responding to a position error signal, a method for reducing the response of the servo system and the actuator to radial runout of the circular tracks, comprising the steps of:

a. obtaining radial runout data;
    b. storing the radial runout data;
    c. subtracting the radial runout data from the position error signal to obtain a corrected position error signal, the corrected position error signal thereby having components of said radial runout removed therefrom; and
    d. reducing overall track-following of the radial runout by the head by using the corrected position error signal to control the servo system, the overall response of the servo system and the actuator to the position error signal thereby being reduced by respective amounts corresponding to the components of the radial runout removed from the position error signal.

2. The method of claim 1 wherein several repetitions of the radial runout data is stored and a steady state version of the radial runout data is subtracted from the position error signal.

3. The method of claim 1 wherein the radial runout data is stored in RAM.

4. The method of claim 1 wherein the radial runout data is stored on the disk.

5. The method of claim 4 wherein the radial runout data is stored on a user data portion of said disk.

6. The method of claim 1 further including, after step a., the step of filtering said radial runout data wherein said filtering step includes:

i) obtaining radial runout data for a plurality of rotations of the disk;
    ii) passing the radial runout data through an inverse filter; and
    iii) selecting a steady state output of the inverse filter and using this output as the radial runout data in steps b, c and d.

7. The method of claim 1, wherein said radial runout data comprises repeatable runout data.

8. The method of claim 2, wherein said radial runout data comprises repeatable runout data.

9. In a direct access storage device including a rotating disk, a head positioned for interaction with said disk, an actuator for carrying said head and a servo system for operating said actuator so as to follow a substantially circular track on said disk by responding to a position error signal, apparatus for reducing the response of the servo system and the actuator to radial runout of the circular tracks, comprising:
 a. means for obtaining radial runout data;
 b. means for storing the radial runout data;
 c. means for subtracting the radial runout data from the position error signal to obtain a corrected position error signal, the corrected position error signal thereby having components of said radial runout removed therefrom; and
 d. means for reducing overall track-following of the radial runout by the head by controlling the servo system using the corrected position error signal, the overall response of the servo system and the actuator to the position error signal thereby being reduced by respective amounts corresponding to the components of the radial runout removed from the position error signal.

10. The direct access storage device of claim 9 wherein said means for obtaining said radial runout data obtains several repetitions of the radial runout data and said means for storing the data stores a steady state version of the radial runout data.

11. The device of claim 9 further comprising a RAM for storing the radial runout data.

12. The device of claim 9 wherein the disk is configured with portions for storing said radial runout data and said data is stored on said portions.

13. The device of claim 12 wherein the said portions are user data portions of said disk.

14. The device of claim 9 further including a filter for filtering said radial runout data wherein said filter comprises:
 i) means for obtaining radial runout data for a plurality of rotations of the disk;
 ii) an inverse filter through which the radial runout data is passed; and
 iii) means for selecting a steady state output of the inverse filter for use as the radial runout data in said means b, c and d.

15. The method of claim 9, wherein said radial runout data comprises repeatable runout data.

16. The method of claim 10, wherein said radial runout data comprises repeatable runout data.

17. In a data storage device having a head positioned for interaction with a storage medium, and a servo system for moving the head to substantially follow a track on the storage medium by responding to a position error signal, a method comprising:
 determining a component of a runout of the track from its ideal position; and
 reducing overall track-following of the runout by the head by reducing the overall response of the servo system to the position error signal by an amount corresponding to the determined runout component of the track.

18. The method of claim 17, wherein said runout component comprises a repeatable, steady state runout component.

19. In a data storage device having a head positioned for interaction with a storage medium, and a servo system for moving the head to substantially follow a track on the storage medium by responding to a position error signal, an apparatus comprising:
 means for determining a component of a runout of the track from its ideal position; and
 means for reducing overall track-following of the runout by the head by reducing the overall response of the servo system to the position error signal by an amount corresponding to the determined runout component of the track.

20. The apparatus of claim 19, wherein said runout component comprises a repeatable, steady state runout component.

* * * * *